United States Patent
Thompson et al.

(10) Patent No.: US 10,855,097 B2
(45) Date of Patent: Dec. 1, 2020

(54) SYSTEM AND METHOD FOR TEMPERATURE-ADAPTIVE THERMAL MANAGEMENT USING DIFFERENT TEMPERATURE-OPTIMIZED BATTERY CELLS

(71) Applicant: DELL PRODUCTS, LP, Round Rock, TX (US)

(72) Inventors: Rick C. Thompson, Cedar Park, TX (US); Mitchell A. Markow, Hutto, TX (US); Travis C. North, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 207 days.

(21) Appl. No.: 15/999,144

(22) Filed: Aug. 18, 2018

(65) Prior Publication Data
US 2020/0058968 A1    Feb. 20, 2020

(51) Int. Cl.
| | |
|---|---|
| H02J 7/00 | (2006.01) |
| H01M 10/633 | (2014.01) |
| H01M 10/48 | (2006.01) |
| H01M 10/42 | (2006.01) |
| H01M 10/653 | (2014.01) |
| H01M 10/46 | (2006.01) |
| H01M 10/658 | (2014.01) |
| G06F 1/20 | (2006.01) |
| H01M 10/6551 | (2014.01) |

(52) U.S. Cl.
CPC .............. *H02J 7/007* (2013.01); *G06F 1/206* (2013.01); *H01M 10/425* (2013.01); *H01M 10/46* (2013.01); *H01M 10/482* (2013.01); *H01M 10/486* (2013.01); *H01M 10/633* (2015.04); *H01M 10/653* (2015.04); *H01M 10/658* (2015.04); *H01M 10/6551* (2015.04); *H02J 7/007192* (2020.01); *H01M 2010/4271* (2013.01)

(58) Field of Classification Search
CPC ........................... H02J 7/0003; H02J 7/00047
See application file for complete search history.

(56) References Cited

U.S. PATENT DOCUMENTS

| | | | |
|---|---|---|---|
| 8,067,108 B1 | 11/2011 | Johnson | |
| 9,083,019 B2 | 7/2015 | Perry et al. | |
| 2010/0315035 A1* | 12/2010 | Belov | H01M 10/465 320/101 |
| 2010/0328081 A1* | 12/2010 | Hu | H01M 10/48 340/586 |

(Continued)

*Primary Examiner* — David V Henze-Gongola
(74) *Attorney, Agent, or Firm* — Larson Newman, LLP (57) ABSTRACT

A method, an information handling system, and a thermal management system providing a power and thermal solution are provided. In accordance with at least one embodiment, the information handling system includes a battery having a low temperature cell configured to operate over a lower temperature range and a high temperature cell configured to operate over a higher temperature range, a computational electronic circuit operable to dissipate waste heat as a consequence of performing computation, and a thermal conductor thermally coupled to the high temperature cell and to the computational electronic circuit but not to the low temperature cell.

17 Claims, 4 Drawing Sheets

(56) References Cited

U.S. PATENT DOCUMENTS

2011/0074362 A1\* 3/2011 Midorikawa ....... H01M 10/443
                                                  320/150
2013/0078529 A1   3/2013 Yang et al.
2014/0030608 A1   1/2014 l'Abee et al.

\* cited by examiner

SYSTEM AND METHOD FOR TEMPERATURE-ADAPTIVE THERMAL MANAGEMENT USING DIFFERENT TEMPERATURE-OPTIMIZED BATTERY CELLS

FIELD OF THE DISCLOSURE

The present disclosure generally relates to information handling systems, and more particularly relates to thermal management of information handling systems using different temperature-optimized battery cells.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A method, an information handling system, and a thermal management system providing a power and thermal solution are provided. In accordance with at least one embodiment, the information handling system includes a battery having a low temperature cell configured to operate over a lower temperature range and a high temperature cell configured to operate over a higher temperature range, a computational electronic circuit operable to dissipate waste heat as a consequence of performing computation, and a thermal conductor thermally coupled to the high temperature cell and to the computational electronic circuit but not to the low temperature cell.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
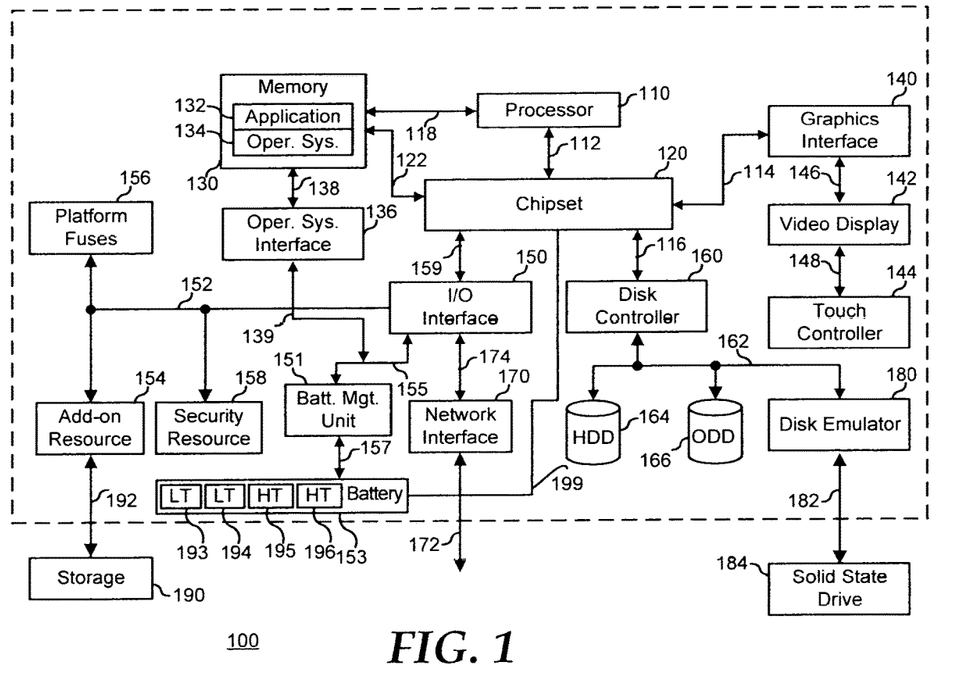
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, include an operating system interface 136, a disk controller 160, a disk emulator 180, an input/output (I/O) interface 150, and a network interface 170. Processor 110 is connected to chipset 120 via processor interface 112. Processor 110 is connected to memory 130 via a memory bus 118. Memory 130 is connected to chipset 120 via a memory bus 122. Memory 130 includes memory storing an application 132 and memory storing an operating system 134. Memory 130 is connected to operating system interface 136 by operating system interface connection 138. Operating system interface 136 is connected to a connection 155 between I/O interface 150 and battery management unit 151 by connection 139. Battery management unit 151 is connected to battery 153 via battery connection 157. Battery 153 includes one or more low temperature cells 193, 194, and one or more high temperature cells 195, 196. High temperature cells 195, 196 are optimized to be capable of operating at a higher temperature than low temperature cells 193, 194. A thermal insulator (shown in FIGS. 2 and 3) can be placed between the low temperature cells 193, 194 and the high temperature cells 195, 196. A thermal conductor 199 is situated in proximity to high temperature cells 195, 196, but not in proximity to low temperature cells 193, 194. Thermal conductor 199 extends to be in proximity to other system components with significant thermal power dissipation, such as processor 120, chipset 120, both, or other system components. As an example, thermal conductor 199 can be a heat pipe, which utilizes thermal conductivity and phase transitions to transfer heat from one location to another. As another example, thermal conductor 199 can be a thermal conductor that utilizes thermal conductivity alone without utilizing phase changes. Graphics interface 140 is connected to chipset 120 via a graphics interface 114, and provides a video display output 146 to a video display 142. Video display 142 is connected to a touch controller 144 via touch controller connection 148. An example of memory 130 includes random access memory (RAM) such as static RAM (SRAM), dynamic RAM (DRAM), non-volatile RAM (NV-RAM), or the like, read only memory (ROM), another type of memory, or a combination thereof.

Disk controller 160 is connected to chipset 120 via disk controller interface 116. I/O interface 150 is connected to chipset 120 via an I/O channel 159. An example of I/O channel 166 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 162 includes a USB interface, an IEEE 1194 (Firewire) interface, a proprietary interface, or a combination thereof. Alternatively, solid-state drive 184 can be disposed within information handling system 100.

I/O interface 150 is connected to a network interface 170 via connection 174. Network interface 170 connects to a network via network connection 172. I/O interface 150 includes a peripheral interface 152 that connects the I/O interface to an add-on resource 154, to a security resource 158, and to platform fuses 156. Add-on resource 154 can connect to, for example, external storage 190 via external connection 192. Peripheral interface 152 can be the same type of interface as I/O channel 159, or can be a different type of interface. As such, I/O interface 170 extends the capacity of I/O channel 159 when peripheral interface 152 and the I/O channel are of the same type, and the I/O interface translates information from a format suitable to the I/O channel to a format suitable to the peripheral channel 152 when they are of a different type. Add-on resource 154 can include a data storage system, an additional graphics interface, a network interface card (NIC), a sound/video processing card, another add-on resource, or a combination thereof. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 110, in another suitable location, or a combination thereof. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channel 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Figure 2:
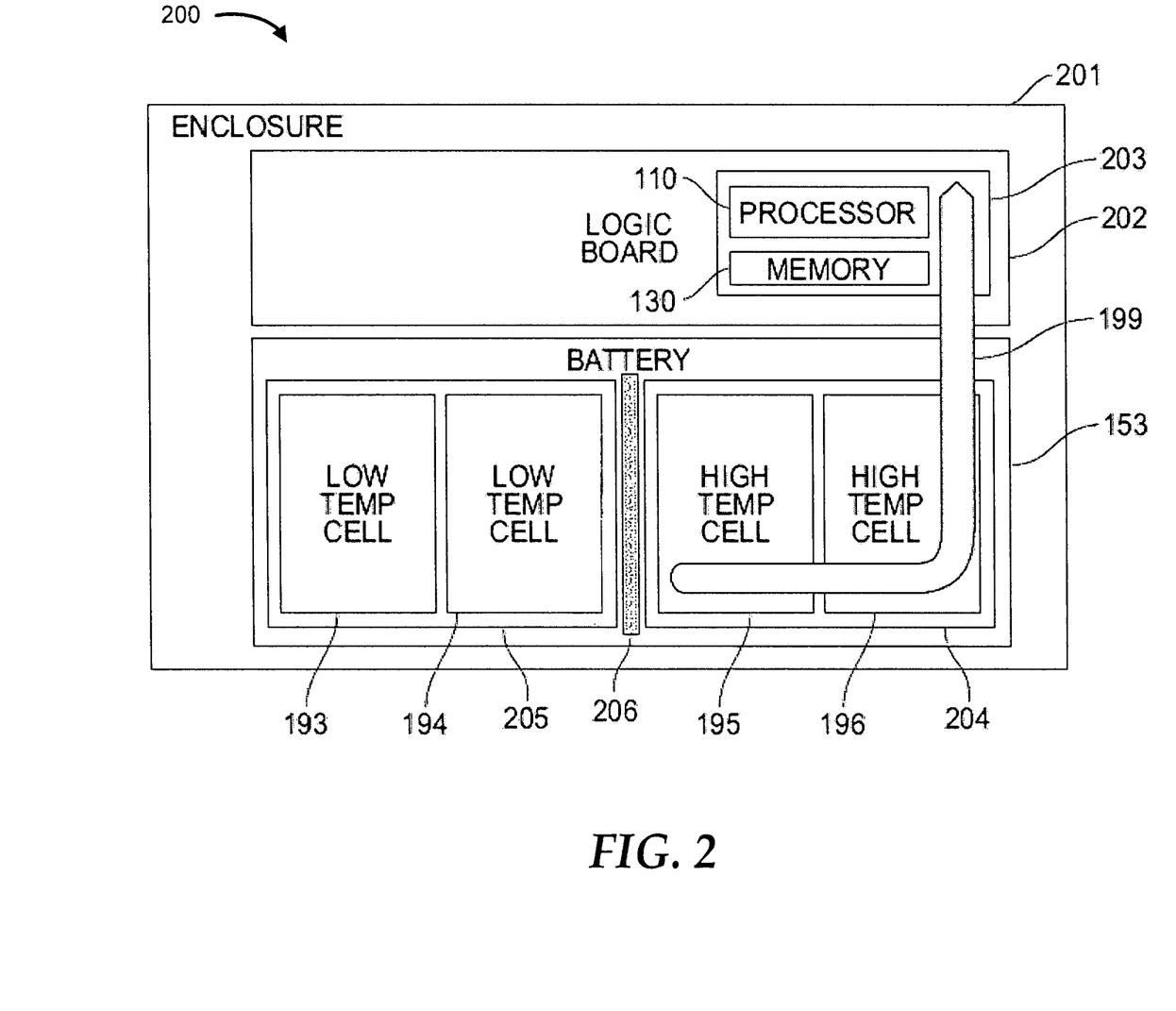
FIG. 2 is a plan view diagram illustrating a thermal management structure according to at least one embodiment of the present disclosure.

FIG. 2 is a plan view diagram illustrating a thermal management structure according to at least one embodiment of the present disclosure. Information handling system 200 is provided within enclosure 201. Enclosure 201 encloses logic board 202, battery 153, and thermal conductor 199. Logic board 202 comprises an area 203 of electronic components in a computational electronic circuit, where the electronic components dissipate significant thermal power, and thus waste heat, as a consequence of their performing computation functions. Examples of such electronic components can include processor 110 and memory 130. Area 203 can be a portion of logic board 202 or can be made of a different material, such as a material exhibiting higher thermal conductivity.

Battery 153 comprises a high temperature cell portion 204 and a low temperature cell portion 205. A thermal insulator 206 can be disposed between high temperature cell portion 204 and low temperature cell portion 205. Thermal conductor 199 extends from area 203 to high temperature cell portion 204 but not to low temperature cell portion 205. As an example, thermal conductor 199 can overlie high temperature cell portion 204, where the term "overlie" refers to a side of high temperature cell portion 204 closer to a less thermally resistive surface of enclosure 201. For example, the less thermally resistive surface of enclosure 201 can be a surface of a more thermally conductive material or of a thinner material than another surface of enclosure 201. As another example, thermal conductor 199 can underlie high temperature cell portion 204, where the term "underlie" refers to a side of high temperature cell portion 204 farther from the less thermally resistive surface of enclosure 201. As another example, thermal conductor 199 can lie in a plane of high temperature cell portion 204. The terms "overlie" and "underlie" are used as described above without regard for an orientation according to which a user may think of a surface as a "top" or "bottom" surface. High temperature cell portion 204 can comprise one or more high temperature cells 195, 196. Low temperature cell portion 205 can comprise one or more low temperature cells 193, 194. Thermal conductor 199 can overlie one or more high temperature cells 195, 196 but not one or more low temperature cells 193, 194. The term "optimized" is used herein to describe manufacturing a cell to perform better under the specified condition (for example, at low temperature or at high temperature) than a cell that has not been "optimized" without necessarily achieving ideal values of relevant parameters. The terms "low temperature" and "high temperature" are used relative to each other. As one example, a standard type of cell can be used as a "low temperature" cell, and a "high temperature" cell can be manufactured to be different from the standard cell to perform better at an elevated temperature. As another example, a standard type of cell can be used as a "high temperature" cell, and a "low temperature" cell can be manufactured to be different from the standard cell to perform better at a depressed temperature. As yet another example, a "low temperature" cell can be manufactured to be different from a standard cell to perform better at a depressed temperature, and a "high temperature" cell can be manufactured to be different from the standard cell to perform better at an elevated temperature.

Figure 3:
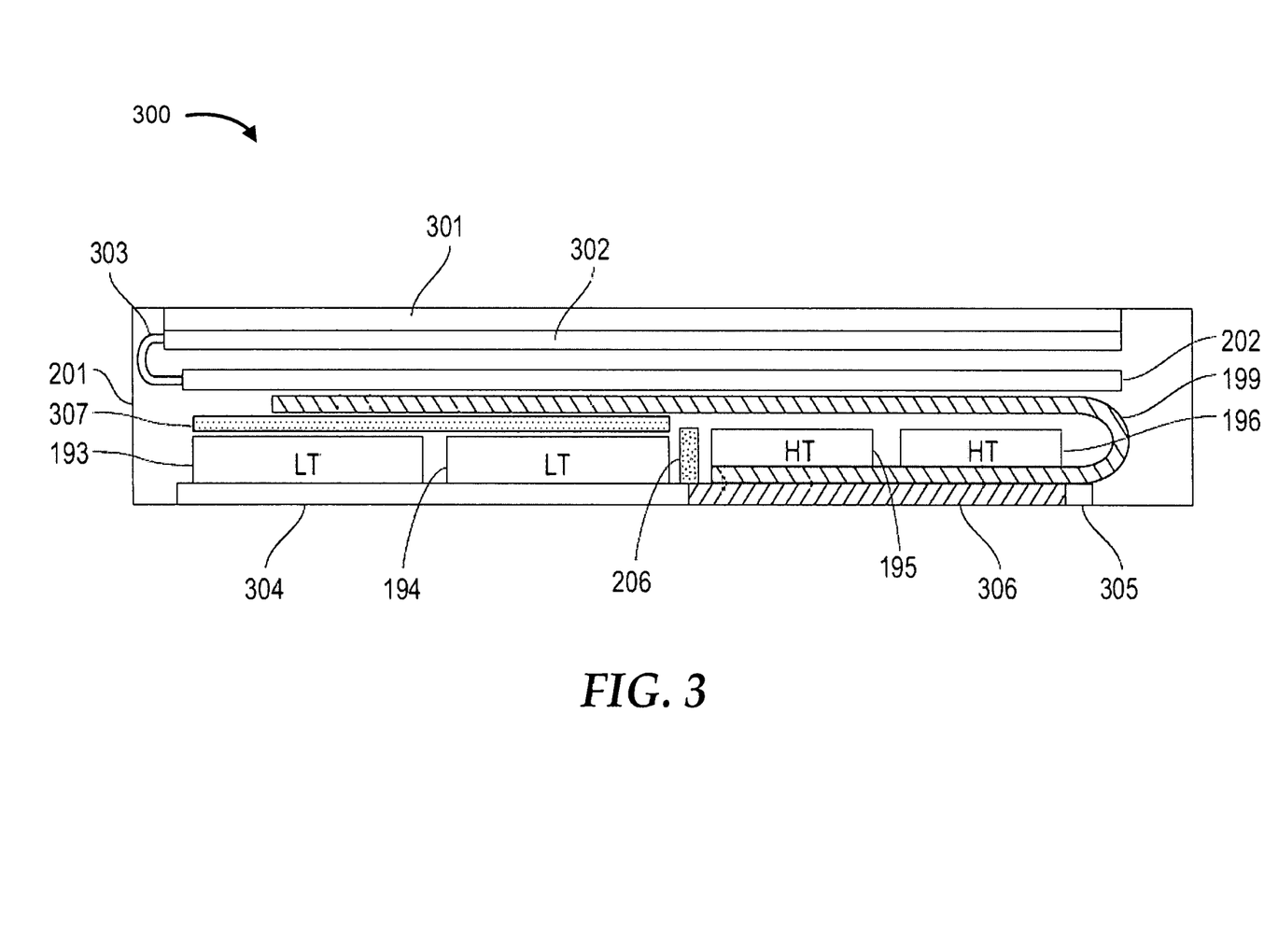
FIG. 3 is an elevation view diagram illustrating a thermal management structure according to at least one embodiment of the present disclosure.

FIG. 3 is an elevation view diagram illustrating a thermal management structure according to at least one embodiment of the present disclosure. Information handling system 300 is provided within enclosure 201. Enclosure 201 encloses digitizer screen 301, display panel 302, display interconnect 303, logic board 202, thermal conductor 199, one or more high temperature cells 195, 196, and one or more low temperature cells 193, 194. A thermal insulator 206 may be disposed between one or more high temperature cells 195, 196 and one or more low temperature cells 193, 194. A thermal insulator 307 may be disposed between one or more low temperature cells 193, 194 and thermal conductor 199. A cover plate 304 is provided for enclosure 201. Cover plate 304 can include a heat spreader panel 306 of lower thermal resistance than the remainder of cover plate 304. A portion 305 of cover plate 304 can surround heat spreader panel 306. While FIG. 3 is shown to be configured as an information handling system having a digitizer screen and display panel on an opposite surface from a cover panel (such as a D-cover) overlying thermal conductor 199, which overlies high temperature cells 195, 196, as may be exemplified, for example by embodiments of tablet information handling systems and phone information handling systems, it should be understood that other types of information handling systems, which may have other form factors, such as notebook information handling system having a keyboard and a hinged display panel may incorporate a thermal management system as disclosed herein. Furthermore, the relative orientations of features such as logic board 202 and battery 153 may be varied. As shown in FIG. 2, logic board 202 may lie adjacent to and substantially in the same plane as battery 153, or, as shown in FIG. 3, logic board 202 may underlie battery 153.

Figure 4:
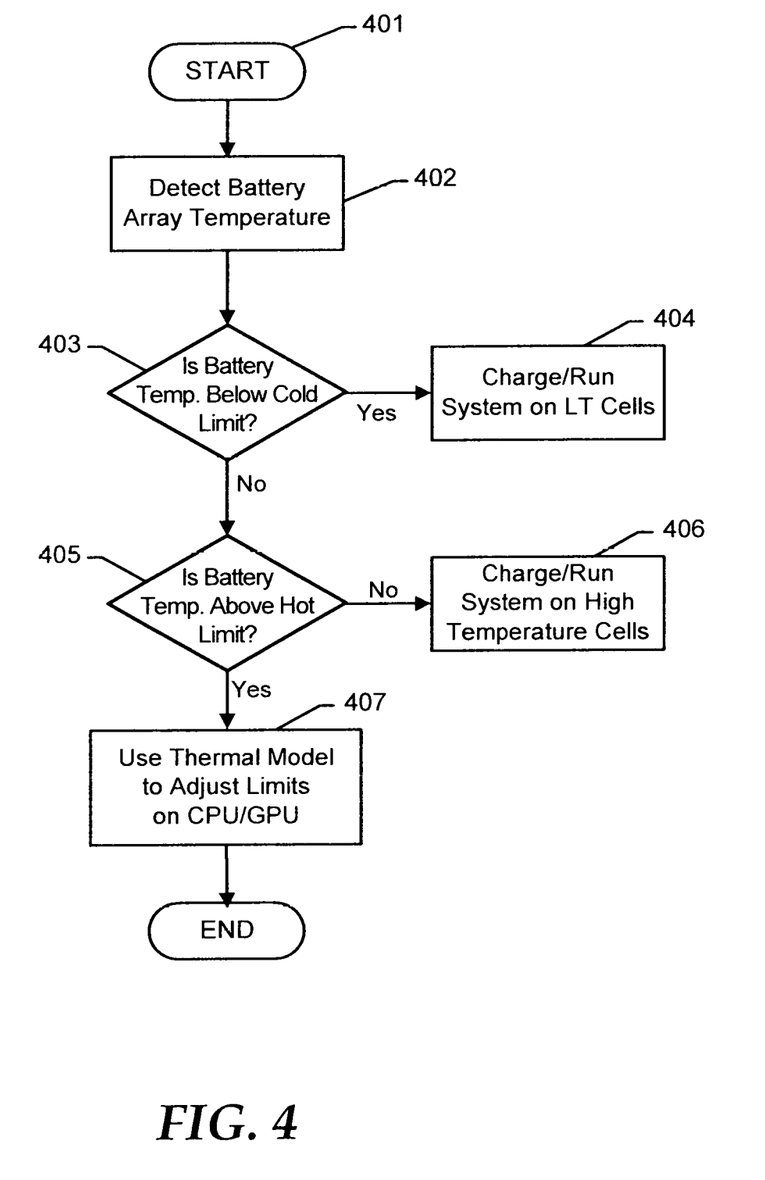
FIG. 4 is a flow diagram illustrating a method for thermal management of an information handling system according to at least one embodiment of the present disclosure.

FIG. 4 is a flow diagram illustrating a method for thermal management of an information handling system according to at least one embodiment of the present disclosure. Method 400 begins in block 401 and continues to block 402. At block 402, detection of a battery array temperature is performed. From block 402, method 400 continues to decision block 403. At decision block 403, a decision is made whether or not the battery temperature is below a cold limit. If the battery temperature is below the cold limit, method 400 continues to block 404. In block 404, the system is powered by one or more low temperature cells 193, 194. If the cells are to be charged, the one or more low temperature cells 193, 194 are charged. From block 404, method 400 can return to block 402.

If, at decision block 403, the decision is made that the battery temperature is not below the cold limit, method 400 continues to decision block 405. At decision block 405, a decision is made whether or not the battery temperature is above a hot limit. If the battery temperature is not above the hot limit, method 400 continues to block 406. In block 406, the system is powered by one or more high temperature cells 195, 196. If the cells are to be charged, the one or more high temperature cells 195, 196 are charged. From block 406, method 400 can return to block 402.

If, at decision block 405, the decision is made that the battery temperature is above the hot limit, method 400 continues to block 407. At block 407, limits on operation of circuitry, such as central processing unit (CPU), a graphics processing unit (GPU), both, or the like are adjusted according to a thermal model. From block 407, method 400 can return to block 402.

Method 400 can further comprise utilizing both the low-temperature cells and the high-temperature cells simultaneously, in a normal temperature mode. For example, between decision block 403 and decision block 405, an additional decision block can be provided to decide whether or not the battery temperature is within a normal temperature range (below a normal temperature limit, where the normal temperature limit is between the cold limit and the hot limit). If the battery temperature is within the normal temperature range, the system can run using both the low-temperature cells and the high-temperature cells (and both the low-temperature cells and the high-temperature cells can be charged). If the battery temperature is not below the normal temperature limit, method 400 can continue to decision block 405 to decide if the battery temperature is or is not above the hot limit.

Information handling systems, such as portable information handling systems like notebook computers, are getting thinner, smaller, and more power dense. Managing heat continues to get more difficult. For systems with heat spreaders, it is useful to utilize as much of the D-cover surface area, such as an area typically considered to be a bottom cover of an information handling system, as possible to dissipate heat, including the area overlying the battery. While D-cover surface area is mentioned, other surface areas of an enclosure of an information handling system can be used to transfer heat to the ambient environment, either in conjunction with a D-cover surface area or as an alternative to the D-cover surface area. Examples of such surface areas include a palm rest area of a notebook information handling system and other surface areas under which a battery may be situated. In a modern ultraportable notebook computer, the battery may occupy, for example, forty percent to sixty percent or more of the chassis footprint of the notebook computer. Accordingly, one or more exterior surfaces of an information handling system may be in thermal communication with a battery or regions in proximity to a battery, where a thermal conductor, such as a heat pipe, may be disposed.

Performance at high and low temperature and over a broad temperature range can be controlled by selecting battery cell parameter values, such as chemicals used, amounts of those chemicals, materials used, dimensions of those materials, and so on. Battery electrolyte solution is a solution of one or more organic solvents with one or more salts and additives. Examples of solvents are ethylene carbonate (EC) and dimethyl carbonate (DMC), although other solvents can be used in conjunction with or as an alternative to one or more of EC and DMC. As an example, the ratio of the solvents can be adjusted to improve high temperature performance or low temperature performance. For example, increasing the ratio of EC to DMC (from, for example, 50%/50% to 70%/30%) can reduce degradation at elevated temperatures, enabling implementation of a high temperature cell, as one example. The type of salt or salts, the concentration of the salt or salts, the type of additive or additives, and the concentration of the additive or additives can be adjusted to influence high and low temperature performance. For example, an additive like methyl propionate can be included to extend low temperature performance, enabling implementation of a low temperature cell, as one example.

A battery cell has a large thermal mass exhibiting a large specific heat capacity. Thermal conductor 199 can be used to move heat dissipated by electronic components to one or more battery cells. Moving heat to the one or more battery cells can allow the one or more battery cells to be used as a heat sink, within acceptable thermal parameters of the one or more battery cells. The battery cell thermal parameter values can be tuned based on temperature requirements. However, operation of an information handling system may span a range of temperatures greater than a range of temperatures any one particular type of battery cell can tolerate. For example, a single type of battery cell may not work well at both high and low temperatures. A battery cell that is stable at high temperature may have a lot of resistance when it is cold (for example, it may not be able to boot the system), while a low temperature battery cell (for example, a standard battery cell) can swell and lose capacity at high temperature.

In accordance with at least one embodiment, a thermal management structure incorporating thermal communication with one or more cells configured to provide high temperature operation in a battery pack also including one or more cells configured to provide low temperature operation. By utilizing a battery pack including a first subset of cells configured for high temperature performance and a second subset of cells configured for low temperature performance, one or more benefits can be obtained. As an example, operation of an information handling system over a larger temperature range can be supported. Active or passive selection between a cell configured for one temperature range and a cell configured for another temperature range can be provided. With active selection among cells, a switch may be provided to switch one cell into a circuit connect to a load and to switch another cell out of the circuit connected to the load. For example, a switch may be implemented in or under the control of battery management unit 151, and wires from one or both of high temperature cell portion 204 and low temperature cell portion 205 may be connected to the switch. With passive selection among cells, the performance characteristics of the differently configured cells may promote one cell to provide greater output at a given temperature and another cell to provide lesser output at the given temperature. The cell performance can be tuned in various ways, for example, provision of different electrode plate areas or different electrolyte formulations. As another example, the thermal mass represented by the specific heat capacity of the one or more high temperature cells may be used as a heat sink to absorb heat generated by electronic components, such as a processor, of the information handling system. For example, an intermittent surge of heat generated from a burst of system activity can be transferred from a circuit board, such as a logic board, of the system to the one or more high temperature cells, via a thermal conductor, such as a heat pipe. Thus, the system can operate longer at elevated system activity levels without thermal limitation of the performance of a system component, such as a processor, by removing heat from the system component that would otherwise be thermally limited in its performance by a temperature rise resulting from its increased activity. As another example, a heat spreader may be provided in proximate to the high temperature cells, with the high temperature cells tolerating heating from their proximity to the heat spreader or heat pipe transferring heat away from the system components dissipating power and producing the heating.

In accordance with at least one embodiment, a thermal conductor extends over or under the high temperature cells. In accordance with at least one embodiment, a heat spreader is provided over a substantial portion or all of a D-cover surface area. The stability of the high temperature cells allows heat to be directed at the battery and allows use of the cells as a thermal reservoir.

In accordance with at least one embodiment, the heat spreader may extend over or under the high temperature and low temperature cells. Accordingly, a heat spreader can be provided over a larger portion or all of the D-cover surface area. The heat spreader can be designed to minimize heat directed toward the low temperature cells by disposing adjacent to the low temperature cells a panel of thermal insulation, such as a laminate including a silicon aerogel layer and an expanded polytetrafluoroethylene (ePTFE) layer, a composite comprising an ePTFE liner and aerogel, with the ePTFE liner serving as a matrix to hold the aerogel material. The ePTFE liner defines voids, which can be filled with the aerogel material. The ePTFE liner can be used as a sheet to provide structure to the aerogel, and the aerogel can provide its superior thermal insulating quality to the ePTFE. As another example, another material having high through-plane heat rejection may be used as thermal insulation disposed adjacent to the low temperature cells.

As an example, a thermal conductor, such as thermal conductor 199, can be disposed to extend under both high-temperature cells, such as high-temperature cells 195 and 196, and low-temperature cells, such as low-temperature cells 193 and 194, with a panel of thermal insulation disposed between the thermal conductor and the low-temperature cells. For example, the thermal conductor could cover a substantial portion (e.g., the entire length) of the housing (e.g., the D-cover) with the thermal insulation between the low-temperature cells and the thermal conductor, with the thermal insulation between the low-temperature cells and the housing, or both. Thus, heat can be moved away from heat-generating components on at least a portion (e.g., area 203) of a circuit board, such as logic board 202, to a large area of the housing (e.g., an area spanning a cover panel, including, for example, cover plate 304, heat spreader plate 306, and portion 305). As an example, heat spreader plate 306 can be correspondingly increased in size, or cover plate 304 may be constructed of a thermally conductive material to move the heat from a more extensive thermal conductor configuration to the environment adjacent to the housing.

In accordance with either approach, the cells optimized for low temperature can ensure the information handling system is able to boot and operate at low temperatures. When the system is in use and the thermal solution moves heat to the high temperature cells, the electrolyte of the high temperature cells may become more conductive and may operate efficiently while enabling the system to remain cool and stay in a higher performance mode longer without throttling the system activity level or using a fan. Thus, a sustained level of higher system performance can be provided, and the higher efficiency of avoiding use of electricity to operate a fan (in a system with a fan) can be obtained.

A battery control structure can be configured, relative to temperature, for the different types of battery cells to be passively or actively managed. Either way, the manner in which the different types of battery cells are used to power the load represented by the system power draw or the manner in which the different types of battery cells are charged can be configured based on temperature.

With active management of the different types of battery cells, a battery control structure, such as battery management unit (BMU) 151 comprising a battery management circuit, can be configured to control the different types of battery cells based on the respective temperature capabilities of the respective different types of battery cells. For example, in a battery with four cells organized as two parallel branches of two cells in series for each branch (a 2S2P configuration), the battery can be actively configured, for example, as a single branch (a 2S1P configuration) of two low temperature cells in series for low temperature operation, as the two parallel branches (the 2S2P configuration) comprising one branch of two low temperature cells in series and another branch of two high temperature cells in series for moderate temperature operation, or as a single branch (another 2S1P configuration) of two high temperature cells in series for high temperature operation. For example, if the measured temperature is below a cold threshold, the BMU can isolate the low temperature optimized cell bank (such as 2S1P configuration) so that it but not the high temperature optimized cell bank (such as the other 2S1P configuration) can be used to boot up and begin (or continue) operation of the system.

With passive management of the different types of battery cells, the high temperature cells can be expected to exhibit a higher internal impedance when cold (such as during a cold start), while the low temperature cells can be expected to exhibit a lower internal impedance when cold, so the low temperature cells can be expected to source a majority of the current being drawn when the battery cells are cold, while the high temperature cells can be expected to source a minority of the current being drawn when the battery cells are cold, as their higher internal impedance can be expected to limit their current output when cold.

In accordance with at least one embodiment, a reduction in system performance as an information handling system increases in temperature can be avoided or delayed. In accordance with at least one embodiment, the operation of a fan or an increase in fan speed can be avoided or delayed. In accordance with at least one embodiment, a need to keep thermal management components away from battery components can be avoided. In accordance with at least one embodiment, battery control structures for operational and non-operational temperature can manage subsets of cells in a battery pack separately rather than managing the entire battery pack as a unit without finer granularity. In accordance with at least one embodiment, implementation of additional cooling systems, such as water cooling, can be avoided or the operation thereof can be delayed or otherwise reduced.

In accordance with at least one embodiment, a notebook information handling system is provided with a heat spreader overlying its battery comprising a plurality of thermally differentiated cell types. In accordance with at least one embodiment, a tablet information handling system is provided with a heat spreader overlying its battery comprising a plurality of thermally differentiated cell types. In accordance with at least one embodiment, a telephone information handling system is provided with a heat spreader overlying its battery comprising a plurality of thermally differentiated cell types. In accordance with at least one embodiment, a battery with a high temperature portion and a low temperature portion is provided. In accordance with at least one embodiment, a heat conductor is provided to move heat to a battery or to a specific portion of the battery. In accordance with at least one embodiment, a thermal management system is configured to transfer waste heat from operation of a computational electronic circuit to a high temperature compatible subset of a battery comprising the high temperature compatible subset and a low temperature compatible subset.

In accordance with at least one embodiment, a method comprises detecting a battery array temperature of a battery comprising a low temperature cell configured to operate over a lower temperature range and a high temperature cell configured to operate over a higher temperature range; determining if the battery array temperature is below a cold threshold; when the battery array temperature is below the cold threshold, powering an information handling system from the low temperature cell; determining if the battery array temperature is above a hot threshold; when the battery array temperature is above the hot threshold, adjusting operation of the information handling system to reduce power dissipation; and, when the battery array temperature is above the cold threshold and below the hot threshold, powering the information handling system from the high temperature cell. In accordance with at least one embodiment, the powering the information handling system from the high temperature cell comprises operating the information handling system from both the high temperature cell and the low temperature cell. In accordance with at least one embodiment, the powering the information handling system from the low temperature cell comprises operating the information handling system from both the low temperature cell and the high temperature cell. In accordance with at least one embodiment, the method further comprises transferring heat from a computational electronic circuit of the information handling system to the high temperature cell. In accordance with at least one embodiment, the method further comprises switching an electrical connection of the high temperature cell to the computational electronic circuit of the information handling system on a basis of the battery array temperature. In accordance with at least one embodiment, the method further comprises transferring heat from a computational electronic circuit of the information handling system to a heat spreader overlying the high temperature cell at an exterior surface of the information handling system. In accordance with at least one embodiment, the method further comprises steering a charging current from the charging circuit selectively among the low temperature cell and the high temperature cell.

In accordance with at least one embodiment, an information handling system comprises a battery comprising a low temperature cell configured to operate over a lower temperature range and a high temperature cell configured to operate over a higher temperature range; a computational electronic circuit operable to dissipate waste heat as a consequence of performing computation; a thermal conductor thermally coupled to the high temperature cell and the computational electronic circuit but not to the low temperature cell. In accordance with at least one embodiment, the information handling system further comprises a battery management circuit electrically connected to the battery, the battery management circuit configured to switch a load to be connected to the high temperature cell. In accordance with at least one embodiment, the information handling system further comprises a battery management circuit electrically connected to the battery, the battery management circuit configured to switch a load to be connected to the high temperature cell. In accordance with at least one embodiment, the battery comprises a thermal insulator disposed between the low temperature cell and the high temperature cell. In accordance with at least one embodiment, the information handling system further comprises a thermal insulator between the low temperature cell and the thermal conductor. In accordance with at least one embodiment, the information handling system further comprises a heat spreader overlying the high temperature cell at an exterior surface of the information handling system, the heat spreader thermally coupled to the thermal conductor. In accordance with at least one embodiment, the information handling system further comprises a charging circuit, and the charging circuit is configured to steer a charging current from the charging circuit selectively among the low temperature cell and the high temperature cell.

In accordance with at least one embodiment, a thermal management system comprises a battery comprising a low temperature cell configured to operate over a lower temperature range and a high temperature cell configured to operate over a higher temperature range; a computational electronic circuit operable to dissipate waste heat as a consequence of performing computation; a thermal conductor thermally coupled to the high temperature cell and the computational electronic circuit but not to the low temperature cell. In accordance with at least one embodiment, the thermal management system further comprises a battery management circuit electrically connected to the battery, and the battery management circuit is configured to switch a load to be connected to the high temperature cell. In accordance with at least one embodiment, the thermal management system further comprises a battery management circuit electrically connected to the battery, the battery management circuit configured to switch a load to be connected to the high temperature cell. In accordance with at least one embodiment, the battery comprises a thermal insulator disposed between the low temperature cell and the high temperature cell. In accordance with at least one embodiment, the thermal management system further comprises a thermal insulator between the low temperature cell and the thermal conductor. In accordance with at least one embodiment, the thermal management system comprises a cover plate overlying the high temperature cell, the cover plate comprising a heat spreader thermally coupled to the thermal conductor.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   detecting a temperature of a battery array including a low temperature cell configured to operate over a lower temperature range and a high temperature cell configured to operate over a higher temperature range;
   determining if the battery array temperature is below a cold threshold;
   when the battery array temperature is below the cold threshold, powering an information handling system from the low temperature cell;
   determining if the battery array temperature is above a hot threshold;
   when the battery array temperature is above the hot threshold, reducing power dissipated by the information handling system;
   when the battery array temperature is above the cold threshold and below the hot threshold, powering the information handling system from the high temperature cell;
   transferring heat from a computational electronic circuit of the information handling system to a heat spreader overlying the high temperature cell at an exterior surface of the information handling system but not overlying the low temperature cell at the exterior surface; and
   transferring heat from the computational electronic circuit of the information handling system to the high temperature cell.

2. The method of claim 1, wherein the powering the information handling system from the high temperature cell comprises operating the information handling system from both the high temperature cell and the low temperature cell.

3. The method of claim 1, wherein the powering the information handling system from the low temperature cell comprises operating the information handling system from both the low temperature cell and the high temperature cell.

4. The method of claim 1 further comprising:
   switching an electrical connection of the high temperature cell to the computational electronic circuit of the information handling system on a basis of the battery array temperature.

5. The method of claim 1 further comprising:
   steering a charging current from the charging circuit selectively among the low temperature cell and the high temperature cell.

6. An information handling system comprising:
   a battery including a low temperature cell configured to operate over a lower temperature range and a high temperature cell configured to operate over a higher temperature range;
   a computational electronic circuit operable to dissipate waste heat as a consequence of performing computation; and
   a thermal conductor thermally coupled to the high temperature cell and to the computational electronic circuit but not to the low temperature cell; and
   a heat spreader overlying the high temperature cell at an exterior surface of the information handling system but not overlying the low temperature cell at the exterior surface, the heat spreader thermally coupled to the thermal conductor.

7. The information handling system of claim 6 further comprising:
   a battery management circuit electrically connected to the battery, the battery management circuit configured to switch a load to be connected to the high temperature cell.

8. The information handling system of claim 6 further comprising:
   a battery management circuit electrically connected to the battery, the battery management circuit configured to switch a load to be connected to the low temperature cell.

9. The information handling system of claim 6, wherein the battery comprises a thermal insulator disposed between the low temperature cell and the high temperature cell.

10. The information handling system of claim 6 further comprising:
    a thermal insulator between the low temperature cell and the thermal conductor.

11. The information handling system of claim 6 further comprising a charging circuit, the charging circuit configured to steer a charging current from the charging circuit selectively among the low temperature cell and the high temperature cell.

12. A thermal management system comprising:
    a battery including a low temperature cell configured to operate over a lower temperature range and a high temperature cell configured to operate over a higher temperature range;
    a computational electronic circuit operable to dissipate waste heat as a consequence of performing computation; and
    a thermal conductor thermally coupled to the computational electronic circuit; and
    a heat spreader overlying the high temperature cell at an exterior surface of the information handling system but not overlying the low temperature cell at the exterior surface, the heat spreader thermally coupled to the thermal conductor.

13. The thermal management system of claim 12 further comprising:
    a battery management circuit electrically connected to the battery, the battery management circuit configured to switch a load to be connected to the high temperature cell.

14. The thermal management system of claim 12, further comprising:
 a battery management circuit electrically connected to the battery, the battery management circuit configured to switch a load to be connected to the low temperature cell.

15. The thermal management system of claim 12, wherein the battery comprises a thermal insulator disposed between the low temperature cell and the high temperature cell.

16. The thermal management system of claim 12 further comprising:
 a thermal insulator between the low temperature cell and the thermal conductor.

17. The thermal management system of claim 12 further comprising:
 a cover plate overlying the high temperature cell, the cover plate comprising the heat spreader thermally coupled to the thermal conductor.

\* \* \* \* \*